United States Patent
Chiang et al.

(10) Patent No.: US 7,889,486 B2
(45) Date of Patent: Feb. 15, 2011

(54) DISPLAY DEVICE AND ROTATABLE STAND THEREOF

(75) Inventors: Ping-Chih Chiang, Taipei (TW); Cheng-Wei Chen, Taipei (TW); Yu-Chao Su, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 196 days.

(21) Appl. No.: 12/192,136

(22) Filed: Aug. 15, 2008

(65) Prior Publication Data

US 2009/0073643 A1 Mar. 19, 2009

(30) Foreign Application Priority Data

Sep. 7, 2007 (TW) .............................. 96133456 A

(51) Int. Cl.
- G06F 1/16 (2006.01)
- H05K 5/00 (2006.01)
- H05K 7/00 (2006.01)

(52) U.S. Cl. .................................. 361/679.22; 248/917
(58) Field of Classification Search ............ 361/679.21, 361/679.26, 679.22; 248/917; 16/273
See application file for complete search history.

(56) References Cited

U.S. PATENT DOCUMENTS

| | | | | |
|---|---|---|---|---|
| 4,067,184 A | | 1/1978 | Johnson, Jr. | |
| 4,781,347 A | * | 11/1988 | Dickie | 248/183.1 |
| 5,978,211 A | * | 11/1999 | Hong | 361/679.23 |
| 6,018,847 A | * | 2/2000 | Lu | 16/337 |
| 6,032,918 A | * | 3/2000 | Cho | 248/688 |
| 6,125,509 A | * | 10/2000 | Hartigan et al. | 16/337 |
| 6,229,584 B1 | * | 5/2001 | Chuo et al. | 349/58 |
| 6,250,645 B1 | | 6/2001 | Udagawa | |
| 6,297,946 B2 | * | 10/2001 | O'Neal et al. | 361/679.27 |
| 6,330,993 B1 | * | 12/2001 | Cho | 248/371 |
| 6,460,512 B1 | | 10/2002 | Serio | |
| 6,476,884 B1 | * | 11/2002 | Shao | 349/58 |
| 6,816,364 B2 | * | 11/2004 | Helot et al. | 361/679.06 |
| 7,088,577 B2 | * | 8/2006 | Lauffer et al. | 361/679.21 |
| 7,150,358 B2 | | 12/2006 | Carr et al. | |
| 7,195,214 B2 | * | 3/2007 | Lee et al. | 248/125.8 |
| 7,460,363 B2 | * | 12/2008 | Teng | 361/679.27 |
| 2002/0174519 A1 | * | 11/2002 | Huang | 16/319 |
| 2004/0084579 A1 | * | 5/2004 | Lee et al. | 248/125.1 |
| 2004/0084585 A1 | * | 5/2004 | Watanabe et al. | 248/276.1 |
| 2004/0118984 A1 | * | 6/2004 | Kim et al. | 248/149 |
| 2006/0175476 A1 | * | 8/2006 | Hasegawa et al. | 248/125.1 |
| 2007/0040084 A1 | * | 2/2007 | Sturman et al. | 248/280.11 |

* cited by examiner

*Primary Examiner*—Jayprakash N Gandhi
*Assistant Examiner*—Adrian S Wilson
(74) *Attorney, Agent, or Firm*—Jianq Chyun IP Office

(57) ABSTRACT

A display device including a rotatable stand and a display module provided on the rotatable stand is provided. The rotatable stand includes a base, a sleeve provided on the base, a composite washer, and a rotatable structure. One end of the sleeve is connected with the base. The composite washer has a flexible material layer and a rigid material layer. Further, the rotatable structure is disposed through the sleeve, the display module is adapted to be fixedly connected with one end of the rotatable structure, and the composite washer is disposed between the display module and the sleeve. The first rigid material layer contacts the display module, and the flexible material layer is disposed between the sleeve and the second rigid material layer.

16 Claims, 2 Drawing Sheets

DISPLAY DEVICE AND ROTATABLE STAND THEREOF

CROSS-REFERENCE TO RELATED APPLICATION

This application claims the priority benefit of Taiwan application serial no. 96133456, filed on Sep. 7, 2007. The entirety of the above-mentioned patent application is hereby incorporated by reference herein and made a part of specification.

BACKGROUND OF THE INVENTION

1. Field of the Invention

The invention relates to a rotatable stand and, more particularly, to a rotatable stand of a display device.

2. Description of the Related Art

With the development of the science and technology, electronic devices are closely related to the daily life. As the electronic technology develops continuously, innovations on electronic devices with personalization and a good function also appear continuously. The television evolution is from conventional cathode ray tube (CRT) televisions to present liquid crystal televisions or plasma televisions, all the manufacturers are pursuing the high-quality images. The present liquid crystal television or the plasma television in the market usually has a rotatable stand for bearing a liquid crystal display module or a plasma display module, and users can rotate the liquid crystal display module or the plasma display module via the rotatable stand to adjust the angle suitable for viewing.

As described above, when the liquid crystal display module or the plasma display module is adjusted for suitable viewing, joint gaps between the liquid crystal display module or the plasma display module and the rotatable stand would result in excessive vibration after the liquid crystal television or the plasma television is rotated to a certain angle. This results in inconvenience for the users.

BRIEF SUMMARY OF THE INVENTION

The invention provides a rotatable stand and a display device with the rotatable stand. The rotatable stand, according to a preferred embodiment of the invention, can reduce the vibration thus to increase the firmness of the display device when a display module is rotated.

The invention provides a rotatable stand connected with a display module of a display device, wherein the display module includes a display unit and a cover for covering up wires. The rotatable stand includes a base, a sleeve provided on the base, a composite washer, and a rotatable structure. One end of the sleeve is connected with the base. The composite washer has a flexible material layer and a first rigid material layer. Further, the rotatable structure is disposed through the sleeve, the display module is firmly connected with one end of the rotatable structure, and the composite washer is disposed between the display module and the sleeve.

In a preferred embodiment, the rotatable structure has a rotating shaft and a fixed portion. The rotating shaft is disposed through the sleeve, and the display unit is adapted to one surface of the fixed portion.

In a preferred embodiment, materials of the flexible material layer and the first rigid material layer of the composite washer may be polymers.

In a preferred embodiment, the other end of the sleeve has a notch for receiving the composite washer.

In a preferred embodiment, the flexible material layer contacts the sleeve.

In a preferred embodiment, the composite washer further includes a second rigid material layer. The flexible material layer is provided between the first rigid material layer and the second rigid material layer, and the second rigid material layer contacts the sleeve.

In a preferred embodiment, a material of the second rigid material layer can be a polymer.

In a preferred embodiment of a display device, the cover for covering up wires is fixed on the other surface of the fixed portion opposite to the display unit, and a bottom side of the cover contacts the first rigid material layer.

The invention further provides a display device including the display module and the rotatable stand aforementioned.

A composite washer is disposed between the display module and the sleeve, wherein the rigid material layer of the composite washer contacts the display module and the flexible material layer of the composite washer is provided between the sleeve and the rigid material layer. Since the rigid material layer contacts the display module, the composite washer is not easy to be abraded when the display module rotates relatively to the rotatable stand. Further, since the flexible material layer disposed between the sleeve and the first rigid material layer absorbs vibration, the composite washer can reduce the vibration to increase the firmness of the display device when the display module rotates.

These and other features, aspects, and advantages of the present invention will become better understood with regard to the following description, appended claims, and accompanying drawings.

DETAILED DESCRIPTION OF THE EMBODIMENTS

Figure 1:
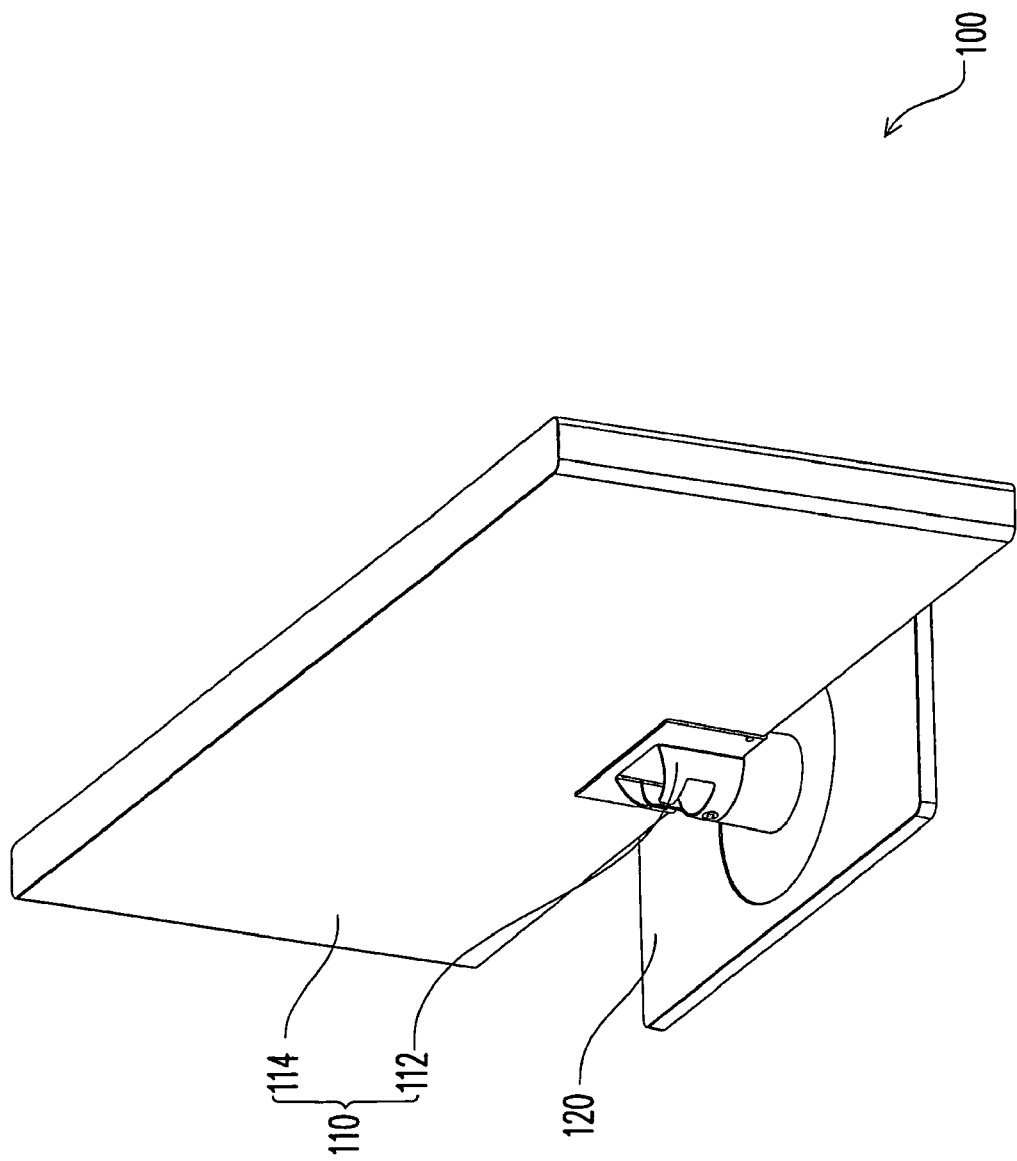
FIG. 1 is a schematic diagram showing a display device according to a preferred embodiment of the invention.

FIG. 1 is a schematic diagram showing a display device according to a preferred embodiment of the invention. The display device 100 includes a display module 110 and a rotatable stand 120. The display module 110 is provided on the rotatable stand 120 Users can rotate the display module 110 via the rotatable stand 120 to adjust the display module 110 to an angle suitable for viewing. In this embodiment, the display device 100 is a liquid crystal television or a plasma television. Next, this embodiment may illustrate the structure of the rotatable stand 120 and the connection relationship between the display module 110 and the rotatable stand 120 hereinbelow.

Figure 2:
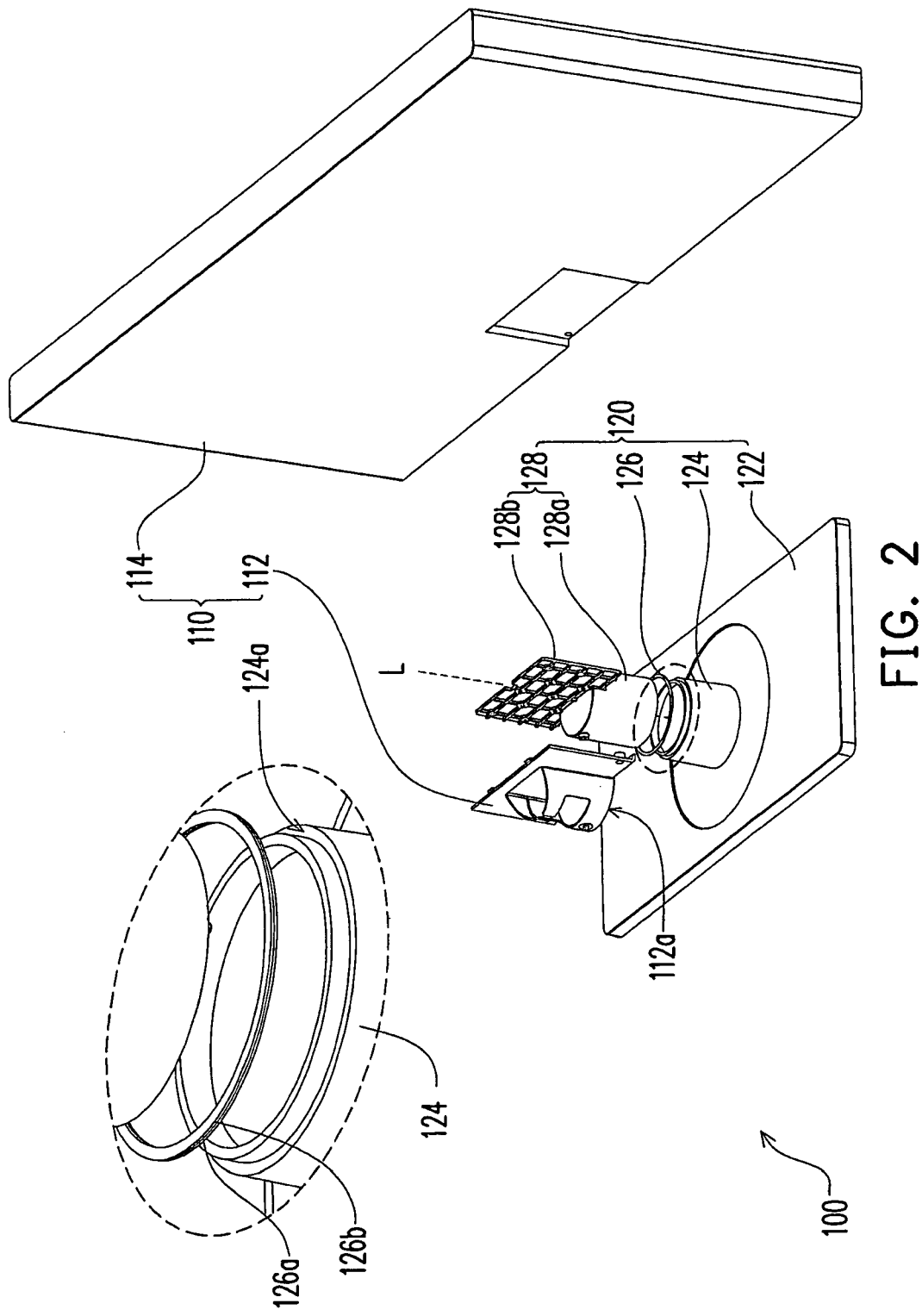
FIG. 2 is an exploded diagram showing the display device in FIG. 1 from another angle.

FIG. 2 is an exploded diagram showing the display device in FIG. 1 from another angle. Please refer to FIG. 2. In the display device 100, the display module 110 includes a cover for covering up wires 112 and a display unit 114. The rotatable stand 120 mainly includes a base 122, a sleeve 124 provided at the base 122, a composite washer 126, and a rotatable structure 128. One end of the sleeve 124 is connected with the base 122, and the composite washer 126 is provided between the display module 110 and the sleeve 124. In this embodiment, the other end of the sleeve 124 is formed with a notch 124a to allow the composite washer 126 to be firmly provided between the display module 110 and the sleeve 124.

Further, for example, the rotatable structure 128 has a rotating shaft 128a and a fixed portion 128b provided on one end of the rotating shaft 128a. The rotating shaft 128a is disposed through the sleeve 124 along an axis of rotation L. The display unit 114 of the display module 110 is adapted to be fixedly disposed at one surface of the fixed portion 128b via a plurality of locking elements (not shown). The cover for covering up wires 112 of the display module 110 is fixed on the other surface of the fixed portion 128b opposite to the display unit 114. That is, the surface of the fixed portion 128b where the cover for covering up wires 112 is disposed, is opposite to the surface where the display unit 114 is disposed. Thus, outer wires (not shown) of the display module 110 can be received in order. Therefore, the display module 110 can rotate relatively to the base 122 via the pivoting connection between the sleeve 124 and the rotating shaft 128a.

The composite washer 126 disposed between the display module 110 and the sleeve 124 can effectively fill gaps between the display module 110 and the sleeve 124. Therefore, the display module 110 can steadily rotate relatively to the base 122. In detail, the composite washer 126 according to this embodiment is mainly composed of a flexible material layer 126a which can absorb vibration and a first rigid material layer 126b which is abrasion-resistant. Preferably, the first rigid material layer 126b contacts a bottom side 112a of the cover for covering up wires 112, and the flexible material layer 126a is provided between the sleeve 124 and the first rigid material layer 126b. When the display module 110 is rotated along the axis of rotation L, the composite washer 126 can effectively reduce the vibration of the display module 110 since the flexible material layer 126a of the composite washer 126 absorbs the vibration, thus to allow the display module 110 to steadily rotate relatively to the base 122.

The bottom side 112a of the cover for covering up wires 112 facing the base 122 contacts the first rigid material layer 126b. Therefore, when rotation friction between the composite washer 126 and the cover for covering up wires 112 exists for a long time, the composite washer 126 is not easily abraded thus to maintain the tight connection between the display module 110 and the rotatable stand 120. Further, since the composite washer 126 has the flexible material layer 126a, the composite washer 126 is elastic. The elasticity of the composite washer 126 can provide a buffer effect when the display module 110 rotates relatively to the base 122, and therefore abrasion may not occur between the sleeve 124 and the cover for covering up wires 112. Besides, when the display module 110 rotates relatively to the base 122, since the display unit 114 of the display module 110 can be fixed to where the display unit 114 does not directly contact the sleeve 124, both the display unit 114 and the sleeve 124 may not be abraded.

For example, the flexible material layer and the first rigid material layer are polymers. The material of the flexible material layer 126a can be poron, and the material of the first rigid material layer 126b can be Polyoxymethylene (POM). Certainly, the flexible material layer 126a also can be other appropriate flexible materials, and the first rigid material layer 126b can be other appropriate rigid materials. The invention is not limited thereto.

The composite washer in the aforementioned embodiment is designed for the display device of which one end is fixed (such as the base) and the other end is active (such as the display module). Therefore, the composite washer not only can provide the buffer effect via the flexible material layer 126a when the display module vibrates, but also can avoid the abrasion of the composite washer via the first rigid material layer 126b.

In another preferred embodiment, for example, the composite washer may further include a second rigid material layer, such as a polymer, besides a flexible material layer and a first rigid material layer. The flexible material layer is provided between the first rigid material layer and the second rigid material layer. The first rigid material layer contacts the display module, and the second rigid material layer is disposed between the sleeve and the flexible material layer. Similarly, since the display module contacts the first rigid material layer, the abrasion between the display module and the composite washer does not easily occur when the display module rotates relatively to the base. The flexible material layer of the composite washer can also provide the buffer effect effectively for the display module when the display module vibrates in the rotation. That is, the composite washer including two rigid material layers and a flexible material layer provided between the two rigid material layers can also be abrasion-resistant and provide the buffer effect when the vibration occurs.

As described above, the composite washer including two rigid material layers and a flexible material layer provided between the two rigid material layers can be also provided on a component, whose both two ends are active, to reduce abrasion and vibration due to the rotation.

To sum up, the flexible material layer of the composite washer in the preferred embodiment can absorb the vibration. Therefore, when the display module is rotated relatively to the base, the composite washer can effectively reduce the vibration of the display module. Further, compared with the conventional method that the structure of the base is strengthened to make the display module steadily rotate relatively to the base, the use of the composite washer can reduce the cost.

Further, the rigid material layer of the composite washer has certain hardness, and the rigid material layer contacts the display module fixedly disposed on the fixed portion. Therefore, when the display module rotates relatively to the base, the abrasion between the display module and the composite washer does not easily occur; the composite washer is not easy to be damaged; and the display device can obtain better rotation stability.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A rotatable stand adapted to be connected with a display module of a display device, wherein the display module comprises a display unit and a cover for covering up wires, the rotatable stand comprising:
   a base;
   a sleeve provided at the base, wherein one end of the sleeve is connected with the base;
   a composite washer having a flexible material layer and a first rigid material layer; and
   a rotatable structure disposed through the sleeve, wherein the display module is adapted to be fixedly connected with one end of the rotatable structure;
   wherein the composite washer is provided between the display module and the sleeve.

2. The rotatable stand according to claim 1, wherein the rotatable structure has a rotating shaft and a fixed portion, the rotating shaft is disposed through the sleeve, and the display unit is adapted to be fixedly disposed at one surface of the fixed portion.

3. The rotatable stand according to claim 1, wherein materials of the flexible material layer and the first rigid material layer of the composite washer are polymers.

4. The rotatable stand according to claim 1, wherein the other end of the sleeve has a notch for receiving the composite washer.

5. The rotatable stand according to claim 1, wherein the flexible material layer contacts the sleeve.

6. The rotatable stand according to claim 1, wherein the composite washer further comprises a second rigid material layer, the flexible material layer is provided between the first rigid material layer and the second rigid material layer, and the second rigid material layer contacts the sleeve.

7. The rotatable stand according to claim 6, wherein the material of the second rigid material layer is a polymer.

8. The rotatable stand according to claim 2, wherein the cover for covering up wires is fixed at the other surface of the fixed portion which is opposite to the display unit, and a bottom side of the cover for covering up wires contacts the first rigid material layer.

9. A display device comprising:
a display module; and
a rotatable stand connected with the display module, the rotatable stand comprising:
a base;
a sleeve provided at the base, wherein one end of the sleeve is connected with the base;
a composite washer having a flexible material layer and a first rigid material layer; and
a rotatable structure disposed through the sleeve, wherein the display module is adapted to be fixedly connected with one end of the rotatable structure;
wherein the composite washer is provided between the display module and the sleeve.

10. The display device according to claim 9, wherein the rotatable structure has a rotating shaft and a fixed portion, the rotating shaft is disposed through the sleeve, and the display module is adapted to be fixedly disposed at the fixed portion.

11. The display device according to claim 10, wherein the display module comprises a display unit and a cover for covering up wires, the display unit is adapted to be fixedly disposed at one surface of the fixed portion, the cover for covering up wires is fixed at the other surface of the fixed portion which is opposite to the display unit, and a bottom side of the cover for covering up wires contacts the first rigid material layer.

12. The display device according to claim 9, wherein the other end of the sleeve has a notch for receiving the composite washer.

13. The display device according to claim 9, wherein materials of the flexible material layer and the first rigid material layer of the composite washer are polymers.

14. The display device according to claim 9, wherein the flexible material layer contacts the sleeve.

15. The display device according to claim 9, wherein the composite washer further comprises a second rigid material layer, the flexible material layer is provided between the first rigid material layer and the second rigid material layer, and the second rigid material layer contacts the sleeve.

16. The display device according to claim 15, wherein the material of the second rigid material layer is a polymer.

* * * * *